United States Patent [19]

Nordström

[11] Patent Number: 4,574,651

[45] Date of Patent: Mar. 11, 1986

[54] CONTROL STICK UNIT

[75] Inventor: Lennart Nordström, Linkoping, Sweden

[73] Assignee: Saab-Scania Aktiebolag, Linkoping, Sweden

[21] Appl. No.: 498,857

[22] Filed: May 31, 1983

[30] Foreign Application Priority Data

Jun. 1, 1982 [SE] Sweden .................................. 8203351

[51] Int. Cl.$^4$ .......................... G05G 9/04; G05G 13/00
[52] U.S. Cl. .................................. 74/471 XY; 74/491; 74/523; 200/61.85; 244/234
[58] Field of Search .................. 74/471 XY, 491, 523; 180/333; 200/6 A, 61.85; 244/234, 236, 237; 273/148 B

[56] References Cited

U.S. PATENT DOCUMENTS

| | | | |
|---|---|---|---|
| 2,885,163 | 5/1959 | De Haven | 74/491 X |
| 3,893,346 | 7/1975 | Paul | 74/471 XY X |
| 4,012,014 | 3/1977 | Marshall | 244/234 |
| 4,069,881 | 1/1978 | Shiber | 180/333 X |
| 4,140,200 | 2/1979 | Tucek | 74/471 XY X |
| 4,180,713 | 12/1979 | Gonzales | 180/333 X |

FOREIGN PATENT DOCUMENTS

| | | | |
|---|---|---|---|
| 2123438 | 11/1971 | Fed. Rep. of Germany | 74/491 |
| 995560 | 6/1965 | United Kingdom | 244/234 |

Primary Examiner—Allan D. Herrmann
Attorney, Agent, or Firm—James E. Nilles; James R. Custin

[57] ABSTRACT

A device for individually controlling multiple control functions with one hand comprises a base member movable back and forth and a stick member mounted on the base member to move back and forth with it and swing relative to it. The base member has one portion shaped like a pistol butt, with opposite upright front and rear surfaces and a top surface, and has another column-like upright portion, spaced in front of said front surface, defining an outer side surface. In one gripping position, a hand has its palm against said rear surface, thumb and forefingers overlying the top surface, and other fingers either curled around the butt portion to actuate pushbuttons or the like on its front surface or extended for actuating pushbuttons or the like on said outer side surface. In a second gripping position, for swinging the stick member, the hand has its lower edge on said top surface, and fingers are either curled around the stick member or are extended to actuate pushbuttons on an upward extension of the column-like portion.

13 Claims, 2 Drawing Figures

CONTROL STICK UNIT

FIELD OF THE INVENTION

This invention relates to a device for selective manual control of a plurality of functions and is more particularly concerned with a control device that is engageable by one hand of an operator and whereby the operator can control each of a multiplicity of functions with small movements of the hand and its fingers without removing the hand from the device and while the hand remains comfortably supported by the device.

BACKGROUND OF THE INVENTION

The control device of this invention is suitable for use with many types of apparatus having numerous functions that must be individually controlled by manual inputs. However, the nature and purpose of the device are perhaps most readily understood if it is described as installed in a fighter aircraft, and therefore it is so described herein by way of a particularly appropriate example.

Present day aircraft, and especially fighter aircraft, are equipped to perform a large number of controllable functions, but at the same time they encounter increasingly stringent requirements for compactness and low weight. It has therefore become increasingly difficult to find room in the pilot's compartment for all of the levers, pushbuttons and other manually actuatable control instrumentalities that are needed for control of these many functions, especially in view of the fact that most such instrumentalities must be readily accessible. It is also essential for safety and efficiency that most such instrumentalities be so arranged that the pilot can positively identify each by touch or feel, so that he can actuate a desired instrumentality without having to look at it.

Normal operation of a fighter aircraft, particularly when it is being maneuvered, requires the pilot to keep his left hand on a throttle control (usually a lever or knob) for regulating engine power output and his right hand on a stick that controls movements of the aircraft about its pitch and roll axes. Moving either hand off of the control instrumentality that it normally engages not only risks some degree of momentary lack of control over the aircraft but, more important, requires more or less concentrated attention to direct the hand to the instrumentality to be actuated, and this is especially the case when the unsupported hand is subjected to the high acceleration forces encountered in a sharp turn or similar abrupt maneuver.

It is evident that, so far as possible, control instrumentalities that have to be actuated in flight, and especially those that may have to be actuated in maneuvering flight, should be so located that the pilot can actuate them with his left hand while keeping it on the throttle control or with his right hand while it remains on the stick. Heretofore, however, it has not been known how to so arrange a substantially large number of function control instrumentalities as to achieve this objective and also enable the pilot to select and actuate a desired one of the several instrumentalities merely by touch or feel.

SUMMARY OF THE INVENTION

The general object of the present invention is to provide a control device whereby an operator can deliver selected manual inputs that control each of a substantially large number of functions (twelve or more in a typical case) while his hand remains engaged with the control device and comfortably supported by it.

Another and very important general object of the invention is to provide a control device of the character described that comprises a plurality of control instrumentalities in the nature of switch actuating pushbuttons, rockers, sliders or the like, each of which can be accurately and readily selected by touch or feel without the need for removing a hand from the control device.

A more specific object of the invention is to provide a control device for individually controlling each of a substantial number of functions, having a manually actuatable control instrumentality for each function that can be selected by touch or feel and readily actuated while the hand remains engaged with the device, said device comprising a base member that is bodily movable in a pair of opposite directions, a stick member that is mounted on the base member for motion with it in said directions and for swinging motion relative to it, and control instrumentalities such as levers, pushbuttons, rockers or sliders that are mounted on each of said members.

Another specific object of the invention is to provide a control device which achieves all of the above stated objectives and which provides a comfortable support for an operator's hand in each of two well defined gripping positions of the hand between which the hand can be readily shifted while remaining engaged with the device, and which enables each of a plurality of control instrumentalities to be selected by touch or feel and readily actuated in each of those gripping positions.

A further specific object of the invention is to provide a control device of the above described character that is particularly suitable for use in a fighter aircraft because it enables the pilot to select a desired control instrumentality by touch or feel and to actuate it readily and effectively even when his hand and arm are subjected to high acceleration forces.

These and other objects of the invention that will appear as the description proceeds are achieved in the control device of this invention, which is actuatable by one hand for controlling each of a plurality of functions and which comprises, in general, a base member confined to substantially translatory motion in opposite forward and rearward directions and a stick member that is movable with the base member and swingable relative to it. The base member has a butt portion on which there are a rear surface engageable by the palm of a hand in a lower gripping position and a substantially upwardly facing surface upon which the lower edge of the hand can rest in an upper gripping position, and it also has a stick supporting portion projecting above said upwardly facing surface and which can be embraced by the lower portion of a hand that is in said upper gripping position. The stick member projects substantially upwardly from said stick supporting portion of the base member to be embraced by an upper portion of a hand in said upper gripping position, and it is swingable about a pair of mutually perpendicular axes that extend substantially transversely to its length and intersect one another near the top of said stick supporting portion.

Other novel and distinguishing characteristics of the control device of this invention are explained in the following description of a preferred embodiment of it and are pointed out in the accompanying claims.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

In general, the control device 1 of this invention comprises a base member 20 of somewhat complex shape that is confined to motion in a pair of opposite directions and a stick member 10 that is mounted on the base member 20 to move with it in said opposite directions and to be swingable relative to it.

Figure 1:
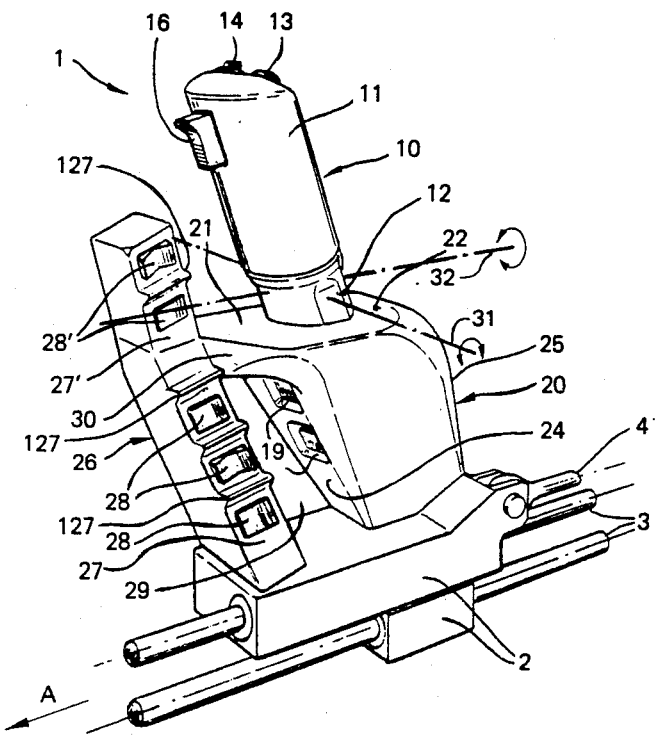
FIG. 1 is a perspective view of a control device of this invention, comprising by way of example, a fighter aircraft throttle control actuated by the pilot's left hand, as it would be seen when looking obliquely rearwardly at it from the left side of the aircraft.
Figure 2:
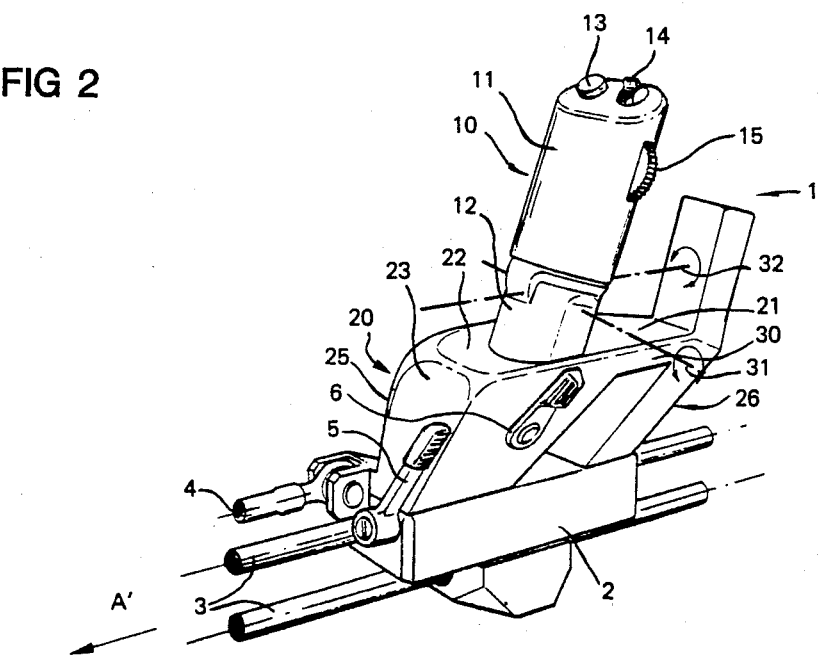
FIG. 2 is a perspective view of the device as seen from its side opposite that shown in FIG. 1, that is, substantially as it would be seen by the pilot.
Figure 4:
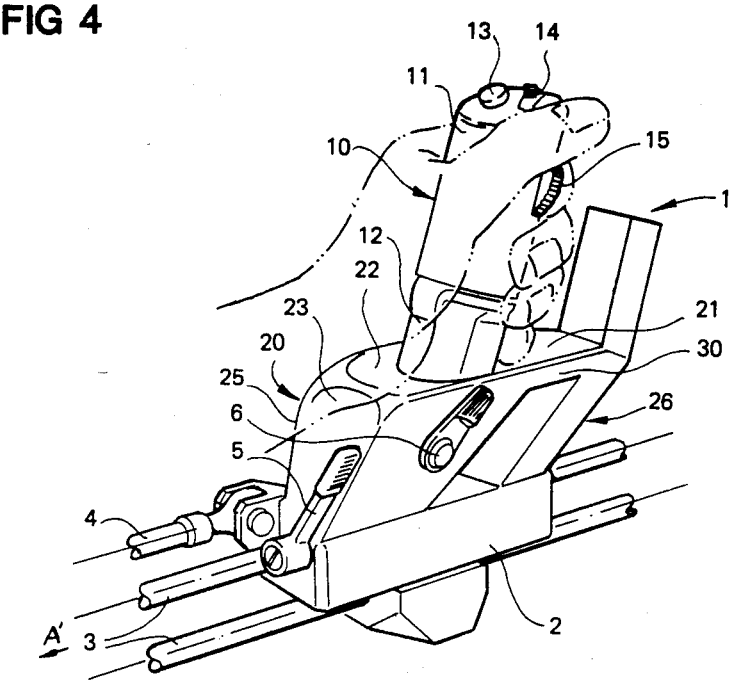
FIG. 4 is a view similar to FIG. 2 but showing a pilot's hand (in broken lines) in an upper gripping position.
Figure 3:
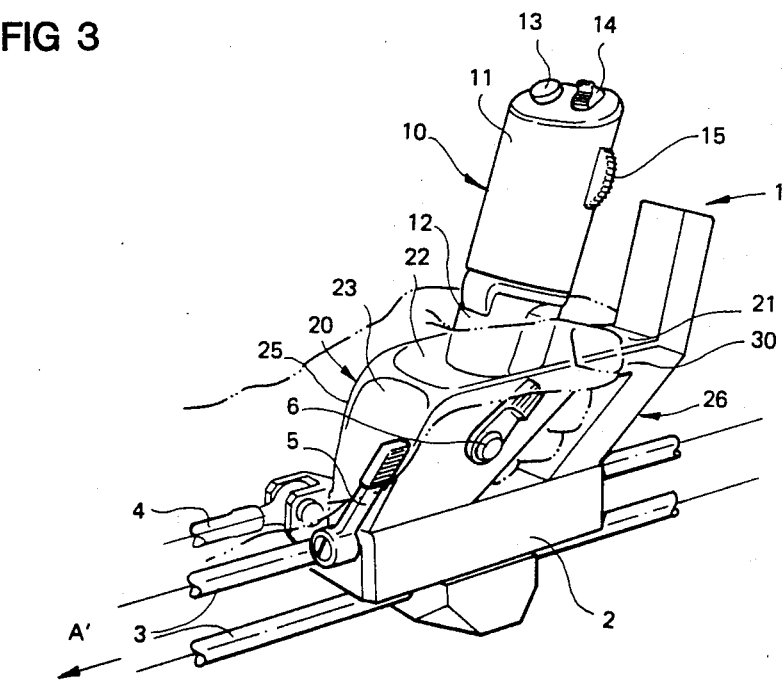
FIG. 3 is a view similar to FIG. 2 but showing a pilots' hand (in broken lines) in a lower gripping position.

In the present case, wherein the control device 1 is illustrated and described by way of example as comprising an aircraft throttle control, the base member 20 has a block-like, somewhat elongated bottom portion 2 that is slideably connected with rod-like fixed guide elements 3 whereby the base member is confined to movement in a forward direction denoted by arrow A in FIG. 1 and an opposite rearward direction A' (FIG. 2).

To simplify the description, such terms as "forward", "rearward", "sideward" and "upward" are used to denote the orientations of parts and surfaces of the device in relation to one another, but these terms are not used in an absolute sense, as signifying a necessary orientation of each such part and surface. Thus, the bodily movement of the base member 20 could be from side to side, or up and down, and all other hereindesignated orientations would be changed accordingly.

In the present exemplary embodiment, fore-and-aft movement of the base member 20 is for conventional aircraft engine throttle control (engine power increases with forward movement), and accordingly an engine throttle linkage 4 is shown connected to the bottom portion 2 of the base member 20.

The base member 20 also has a butt portion 25 that projects up from its bottom portion 2 and is shaped generally like a pistol butt. This butt portion 25 has a substantially upright rear surface 23 (FIG. 2) and a generally upwardly facing top surface 22 that merges into the rear surface 23 at a well-rounded corner, as best seen in FIG. 2. Preferably the rear surface 23 of the butt portion continues downwardly into the rear surface of the block-like bottom portion 2. Projecting up from the top surface 22, spaced a distance forwardly from the rear end of that surface, is a boss-like stick supporting portion 12 of the base member 20, upon which the stick member 10 is swingably mounted.

In a lower gripping position of the pilot's left hand in relation to the control device 1, the palm, and particularly the thumb base pad, rest against the rear surface 23, while the thumb and forefinger can overlie the top surface 22 and embrace the boss-like stick supporting portion 12, and the other three fingers can be curled around the butt portion 25 to have their distal portions overlie its generally upright front surface 24. Those other three fingers are separated from the forefinger by a bridge-like portion 30 of the base member which extends forwardly from the top part of the butt portion 25 and defines a forward continuation 21 of the top surface 22.

It will be apparent that the pilot's hand, in its lower gripping position just described, is comfortably supported, is securely stabilized against maneuvering accelerations, and is located and positioned for efficient actuation of the throttle control.

Adjacent to the rear surface 23 of the butt portion is a releasable lock 5 for cutting off the engine, in the form of a lever mounted on the butt portion to swing from side to side and so arranged and oriented as to be maintained in its unlocking position by the base portion of the thumb of a hand in the lower gripping position. If the thumb is swung down off of the top surface 22, it can engage and actuate a similar lever 6 that is mounted at the inner side of the butt portion and whereby wing flaps or dive brakes can be controlled. Exposed at the front surface 24 of the butt portion are two other control instrumentalities 19, which are here shown as pushbutton switches that are biased forwardly but which could as well be rocker switches or the like. The control instrumentalities 19 are respectively actuatable by the middle finger and the ring finger of a hand in the lower position, and they may provide for on/off control of such functions as automatic speed control and/or automatic pilot.

The stick member 10 is mounted on the boss-like stick supporting portion 12 of the base member by means of a gimbal joint (not shown) or the like, to be swingable relative to the base member about mutually perpendicular substantially horizontal axes 31,32 that intersect near the top of the stick supporting portion 12. In this case the stick member 10 is swingable about a fore-and-aft extending axis 32 and about a laterally extending axis 31 that is parallel to the pitch axis of the aircraft, and it is intended for distance and azimuth angle adjustment of the aircraft radar antenna and/or control of an indicator marker. In a normal or neutral position, the stick member 10 preferably projects up from the stick supporting portion 12 at a forward inclination.

For its swinging motion the stick member 10 is actuated by the pilot's hand when that hand is in an upper gripping position in which the lower edge of the hand rests on the top surface 22 of the base member and in which the little finger curls around the stick supporting portion 12 while the upper portion of the hand embraces the stick member 10. It will be apparent that in this upper gripping position the hand is supported and stabilized by the base member 20 for easy and accurate manipulation of the stick member 10, and it will also be apparent that the hand can be very quickly and easily shifted between the upper and lower gripping positions. For adequate hand support, the stick supporting portion 12 is so located on the base member 20 that substantial areas of the top surface 22 extend away from its front, rear and outer sides. Although the top surface 22 is here shown as substantially flat, it will be understood that it can have suitable curvature or curvatures that adapt it to perform its supporting functions with maximum comfort to the user.

In this case four control instrumentalities are mounted on the stick member 10, namely two pushbutton or other switch actuators 13, 14 for actuation by the thumb, mounted on top of the stick member near the rear thereof, used for selection of radar mode; a thumb-actuated wheel 15 which projects from the inner side of the stick member and which can control radar height angle; and a trigger-like switch actuator 16 which projects from the front side of the stick member near its top, for actuation by the forefinger and by which three different radar function modes can be controlled. It will be observed that these control instrumentalities 13, 14, 15, 16 are so placed and oriented as to be readily selected and actuated by feel alone, without likelihood of being confused with one another, and that they are practically inaccessible to the hand in its lower position, thus further ensuring against their being actuated through error or inadvertence. In like manner, the above described control instrumentalities 5, 6 and 19 on the base member, which can be actuated by the hand in its lower position, are practically inaccessible to the hand in its upper gripping position. Nevertheless, positive throttle control is afforded in both the upper and the lower gripping positions of the hand.

To provide for further control instrumentalities that are actuatable by the pilot's left hand, the base member 20 comprises a substantially upright column-like portion 26 that is spaced forwardly from the front surface 24 of the butt portion 25 but is rigidly connected with the butt portion by the bridge portion 30. At its bottom the column-like portion 26 is rigidly connected to the front part of the block-like bottom portion 2 of the base member. A lower part of the column-like portion 26, extending between the bottom portion 2 and the bridge portion 30 of the base member, has three vertically aligned and spaced apart control instrumentalities 28—which can be pushbutton or rocker switch actuators—exposed at its outer side surface 27; and an upper part of the column-like portion, projecting above the bridge portion 30, has two such control instrumentalities 28' exposed at its outer side surface 27'. To assist in locating and identifying the control instrumentalities 28 and 28' by touch or feel, vertically adjacent ones of them are separated by fixed ribs or lands 127 formed on the column-like portion and projecting from its outer side surface 27, 27'.

It will be observed that the butt portion 25 and the column-like portion 26 of the base member 20, together with its bottom portion 2 and its bridge portion 30, define a sidewardly opening passage 29 through the base member in which distal portions of the middle finger, ring finger and little finger can be received when the pilot's hand is in its lower gripping position and those fingers are curled around the butt portion 25, and the middle finger and ring finger can then actuate the control instrumentalities 19. Alternatively, without shifting his left hand out of the lower gripping position, the pilot can extend the first three fingers of that hand for selective actuation of the control instrumentalities 28 on the lower part of the column-like portion. Similarly, when the pilot's left hand is in the upper gripping position and is curled around the stick member 10 and the stick supporting portion 12, the control instrumentalities 28' on the upper part of the column-like portion 26 will not be inadvertently contacted, but by extension of the fingers with the hand in that position he can readily select and actuate those control instrumentalities.

From the foregoing description taken with the accompanying drawings it will be apparent that this invention provides a control device whereby a multiplicity of functions can be selected and controlled solely by touch or feel while an operator's hand at all times remains in supporting and stabilizing engagement with the control device.

What is claimed as the invention is:

1. A control device actuatable by one hand for controlling each of a plurality of functions, comprising:

A. a base member confined to movement in a pair of opposite directions and having
   (1) connection means thereon through which one of said functions is controlled by movement of the base member in said opposite directions,
   (2) a butt portion on which there are
      (a) a substantially upwardly facing surface upon which the lower edge of a hand can rest in an upper gripping position and
      (b) a rear surface which extends downward from said upwardly facing surface to be wholly below the same, said rear surface being engageable by the palm of a hand in a lower gripping position, and
   (3) a stick supporting portion projecting above said upwardly facing surface and which can be embraced by the lower portion of a hand that is in said upper gripping position; and B. a stick member projecting substantially upward from said stick supporting portion to be embraced by an upper portion of a hand in said upper gripping position, said stick member being swingable relative to the stick supporting portion about at least one axis that extends substantially transversely to the length of the stick member and is near the top of said stick supporting portion.

2. The control device of claim 1, further characterized by:
   (1) at least one control instrumentality on said butt portion, exposed at a front surface of the butt portion that is substantially opposite said rear surface, to be engaged and actuated by distal portions of fingers of a hand in said lower gripping position; and
   (2) a forward projection on said butt portion, defining a forward continuation of said upwardly facing surface and having an underside from which said front surface on the butt portion extends downwardly, whereby said front surface is rendered substantially inaccessible to fingers of a hand that is in said upper gripping position.

3. The control device of claim 1 wherein said upwardly facing surface on the butt portion extends forwardly, rearwardly and sidewardly in one direction from said stick supporting portion to support the bottom edge of a hand that is in said upper gripping position, and wherein said stick supporting portion is located and dimensioned to be embraced by the thumb and forefinger of a hand in said lower gripping position when they are supportingly engaged against said upwardly facing surface.

4. The control device of claim 1, further characterized by: a front surface on said butt portion, substantially opposite said rear surface, engageable by distal portions of the middle finger, ring finger and little finger of a hand in said lower gripping position.

5. The control device of claim 4, further characterized by: at least one control instrumentality on said butt portion, exposed at said front surface thereof and actuatable by one of said fingers that is engageable with said front surface in said lower gripping position of the hand.

6. The control device of claim 4, further characterized by:
   (1) said base member further having a substantially upright column-like portion (a) which is spaced forwardly from said front surface on the butt portion and
(b) which has a surface that faces in one sideward direction and is accessible to distal portions of extended fingers of a hand in said lower gripping position; and
(2) at least one control instrumentality on said column-like portion that is exposed at said surface thereon and is actuatable by one of said extended fingers of a hand in said lower gripping position.

7. The control device of claim 6, further characterized by: said base member further having a bottom portion
(1) which is elongated in forward and rearward directions,
(2) from which said butt portion and said column-like portion project upwardly, and
(3) which is slidably connected with forwardly and rearwardly extending guide means for confining the base member to substantially translatory forward and rearward movement.

8. The control device of claim 6, further characterized by: said base member further having a bridge-like portion
(1) which extends between and is connected to the upper part of said butt portion and to said column-like portion, and
(2) which defines a forward continuation of said upwardly facing surface.

9. The control device of claim 8 wherein said column-like portion has an upper part that projects above said bridge-like portion and on which there is a further surface that faces in said one sideward direction, further characterized by:
at least one further control instrumentality on said upper part, exposed at said further surface and actuatable by an extended finger of a hand in said upper gripping position.

10. A control device actuatable by one hand for controlling each of a plurality of functions, comprising:
A. a member confined to substantially translatory movement in a pair of opposite directions and having
(1) a butt portion on which there are
 (a) a substantially upright rear surface engageable by the palm of a hand in a gripping position and
 (b) an opposite substantially upright front surface engageable by distal portions of fingers of a hand in said position that are curled around said butt portion, and
(2) a substantially upright column-like portion
 (a) which is spaced forwardly from said front surface and
 (b) which has an outer side surface engageable by distal portions of said fingers of a hand in said position when said fingers are extended; and
B. a plurality of control instrumentalities exposed on said front surface of the butt portion, each actuatable by one of said curled fingers; and
C. a second plurality of control instrumentalities exposed on said outer side surface of the column-like portion, each actuatable by one of said extended fingers.

11. The control device of claim 10, wherein said member has a top surface for supporting the thumb and forefinger of a hand in said gripping position, further characterized by:
D. said member further having a boss-like stick supporting portion which projects upwardly from said top surface and which can be embraced by the lower portion of a hand that is in a second gripping position with its lower edge supported on said top surface; and
E. an elongated stick member projecting upwardly from said stick supporting portion and connected with the latter to move in said opposite directions with the first mentioned member and to swing relative to it, said stick member being embraceable and actuatable by the upper portion of a hand in said second gripping position.

12. The control device of claim 11, further characterized by:
(1) the first mentioned member having a bridge portion
 (a) which projects forwardly from the upper part of said butt portion and is connected to said column-like portion, and
 (b) which defines a part of said top surface;
(2) said column-like portion having an upper part spaced forwardly from said stick member and
 (a) which projects above said bridge portion and
 (b) on which there is a further outer side surface that is engageable by distal portions of extended fingers of a hand in said second gripping portion; and
(3) a third plurality of control instrumentalities exposed on said further side surface, each actuatable by one of said extended fingers of a hand in said second gripping position.

13. The control device of claim 11, further characterized by: a further plurality of control instrumentalities on said stick member, actuatable by digits of a hand in said second gripping position.

* * * * *